(12) United States Patent
Hamakubo et al.

(10) Patent No.: US 10,072,155 B2
(45) Date of Patent: *Sep. 11, 2018

(54) COATING COMPOSITION

(71) Applicant: HOYA CORPORATION, Tokyo (JP)

(72) Inventors: Katsushi Hamakubo, Hino (JP); Kae Ito, Hino (JP)

(73) Assignee: HOYA CORPORATION, Tokyo (JP)

(*) Notice: Subject to any disclaimer, the term of this patent is extended or adjusted under 35 U.S.C. 154(b) by 268 days.

This patent is subject to a terminal disclaimer.

(21) Appl. No.: 14/780,720

(22) PCT Filed: Mar. 27, 2014

(86) PCT No.: PCT/JP2014/059046
§ 371 (c)(1),
(2) Date: Sep. 28, 2015

(87) PCT Pub. No.: WO2014/157589
PCT Pub. Date: Oct. 2, 2014

(65) Prior Publication Data
US 2016/0068684 A1    Mar. 10, 2016

(30) Foreign Application Priority Data
Mar. 29, 2013   (JP) ................. 2013-074782

(51) Int. Cl.
*G02B 1/14* (2015.01)
*C09D 4/00* (2006.01)
*C08L 33/08* (2006.01)
*C09D 133/08* (2006.01)
*C08K 3/22* (2006.01)
*C09D 133/00* (2006.01)
*G02B 1/111* (2015.01)
*C09D 5/00* (2006.01)
*C09D 7/61* (2018.01)

(52) U.S. Cl.
CPC .......... *C09D 4/00* (2013.01); *C08K 3/22* (2013.01); *C08L 33/08* (2013.01); *C09D 5/00* (2013.01); *C09D 7/61* (2018.01); *C09D 133/00* (2013.01); *C09D 133/08* (2013.01); *G02B 1/111* (2013.01); *G02B 1/14* (2015.01); *C08K 2003/2244* (2013.01); *C08L 2205/025* (2013.01)

(58) Field of Classification Search
CPC ...... C09D 4/00; C09D 133/08; C09D 133/10; C08L 33/08; C08L 33/10; C08L 2205/02; C08L 2205/025
See application file for complete search history.

(56) References Cited

U.S. PATENT DOCUMENTS

| | | | |
|---|---|---|---|
| 2002/0115756 A1 | 8/2002 | Lin et al. | |
| 2004/0105156 A1 | 6/2004 | Kayanoki | |
| 2005/0118430 A1 | 6/2005 | Doi et al. | |
| 2006/0147674 A1 | 7/2006 | Walker et al. | |
| 2007/0231566 A1* | 10/2007 | Yoneyama | G02B 1/105 428/331 |
| 2008/0050601 A1 | 2/2008 | Otani et al. | |
| 2009/0081373 A1 | 3/2009 | Choate | |
| 2010/0330359 A1 | 12/2010 | Ishikawa et al. | |
| 2012/0262664 A1 | 10/2012 | Kues et al. | |
| 2014/0221573 A1* | 8/2014 | Schall | C08F 20/10 525/222 |
| 2016/0032109 A1* | 2/2016 | Hamakubo | C09D 4/00 428/522 |
| 2016/0075882 A1* | 3/2016 | Hamakubo | C09D 4/00 351/159.57 |

FOREIGN PATENT DOCUMENTS

| | | | | |
|---|---|---|---|---|
| EP | 2963460 A1 | 1/2016 | | |
| JP | H08-198985 A | 8/1996 | | |
| JP | 2005343119 A | 12/2005 | | |
| JP | 2006-056924 A | 3/2006 | | |
| JP | 2008-174667 A | 7/2008 | | |
| JP | 2010-031090 A | 2/2010 | | |
| JP | 2010-070602 A | 4/2010 | | |
| JP | 2011-132343 A | 7/2011 | | |
| JP | 2012-184348 A | 9/2012 | | |
| JP | 2012184348 A * | 9/2012 | | |
| WO | WO 2008132045 A2 * | 11/2008 | ............. | A01N 25/10 |
| WO | 20091041533 A1 | 4/2009 | | |
| WO | WO 2013043573 A2 * | 3/2013 | ............. | C08F 20/10 |

OTHER PUBLICATIONS

Krogman, Kevin C., Thad Druffel, and Mahendra K. Sunkara. "Anti-reflective optical coatings incorporating nanoparticles." Nanotechnology 16.7 (2005): S338.*
Jun. 24, 2014 International Search Report issued in International Application No. PCT/JP2014/059046.
Apr. 22, 2015 International Preliminary Report on Patentability issued in International Patent Application No. PCT/JP2014/059046.

* cited by examiner

Primary Examiner — Nicholas E Hill
(74) Attorney, Agent, or Firm — Oliff PLC

(57) ABSTRACT

A coating composition capable of forming an acrylic hard coat film contains (A) an acrylate component and (B) a metal oxide, wherein a mass ratio (B)/(A) of (B) the metal oxide to (A) the acrylate component is from 0.1 to 1.5, (A) the acrylate component comprises components (a-1), (a-2) and (a-3), and a content ratio X of the component (a-1), a content ratio Y of the component (a-2) and a content ratio Z of the component (a-3) satisfies the following conditions (1) and (2). Condition (1): in (A) the acrylate component, X is from 40 to 60% by mass, and a total of Y and Z is from 60 to 40% by mass, and condition (2): in the total of Y and Z, Z is 0% by mass or more and less than 100% by mass.

5 Claims, No Drawings

COATING COMPOSITION

TECHNICAL FIELD

The present invention relates to a coating composition. More specifically, the present invention relates to a coating composition capable of forming an acrylic hard coat film that is excellent in adhesion to an antireflection film while having high scratch resistance.

BACKGROUND ART

A plastic lens is light weight and is excellent in impact resistance as compared to glass, but due to the insufficient surface hardness thereof, the surface thereof is covered with various hard coat films to enhance the scratch resistance. For suppressing surface reflection of a plastic lens, an antireflection film formed by such a method as vacuum vapor deposition using an inorganic material is laminated on a hard coat film.

For example, PTL 1 describes that the scratch resistance and the adhesion to a plastic lens are enhanced with a silicone thermosetting hard coat film.

Various photocuring hard coat films have been proposed as a hard coat film for a plastic lens. For example, PTL 2 describes a coating composition with a cationic curing system for an optical member, which has scratch resistance and weather resistance and contains a compound having an epoxy group, a photo-cationic polymerization initiator, an organic solvent and inorganic fine particles. As a photocuring acrylic hard coat film, for example, PTL 3 describes a photocurable coating composition containing a compound having at least two (meth)acryloyl groups in the molecule thereof, an ionic photopolymerization initiator, and particular metal oxide particles.

CITATION LIST

Patent Literatures

PTL 1: JP-A-8-198985
PTL 2: JP-A-2010-031090
PTL 3: JP-A-2005-343119

SUMMARY OF INVENTION

Technical Problem

The thermosetting hard coat film of PTL 1 cannot be applied to a heat-labile substrate, and requires a curing treatment time of one hour or more, which necessitates an extensive equipment. The coating composition of PTL 2 can be cured in a shorter period of time than thermosetting, but the cationic curing system requires a long curing time and is difficult to be applied to a substrate that does not withstand ultraviolet ray irradiation or heat, and the cationic curing system is limited in composition due to the less options for the monomer and the polymerization initiator contained therein. On a hard coat film formed from the acrylic coating composition described in PTL 3, it is generally difficult to form an antireflection film using an inorganic material by such a method as vacuum vapor deposition, and the adhesion between an acrylic hard coat film and an inorganic antireflection film has not yet been satisfactory.

The present invention has been made in view of the aforementioned circumstances, and an object thereof is to provide a coating composition capable of forming an acrylic hard coat film that is excellent in adhesion to an antireflection film while having high scratch resistance, and an optical member having a hard coat film that is obtained by using the coating composition.

Solution to Problem

As a result of earnest investigations made by the present inventors, it has been found that the problem can be solved by a coating composition that contains a particular acrylate component and a metal oxide in particular ratios, and the present invention has been completed.

The present invention provides the coating compositions and the optical members shown below.

(1) A coating composition containing (A) an acrylate component and (B) a metal oxide, wherein a mass ratio (B)/(A) of (B) the metal oxide to (A) the acrylate component is from 0.1 to 1.5, (A) the acrylate component contains the following components (a-1), (a-2) and (a-3), and a content ratio X of the component (a-1), a content ratio Y of the component (a-2) and a content ratio Z of the component (a-3) satisfies the following conditions (1) and (2):

(a-1): a polyfunctional acrylate compound having 3 or more acrylate groups in one molecule;

(a-2): a dendritic aliphatic compound having an acrylate group at an end thereof; and (a-3): an acrylate compound having 1 or 2 acrylate groups in one molecule; or a mixture of an acrylate compound having 1 or 2 acrylate groups in one molecule and an acrylate compound other than the components (a-1) and (a-2), the condition (1): in (A) the acrylate component, X is from 40 to 60% by mass, and a total of Y and Z is from 60 to 40% by mass, and the condition (2): in the total of Y and Z, Z is 0% by mass or more and less than 100% by mass.

(2) The coating composition according to the item (1), wherein the component (a-3) contains one kind or two or more kinds selected from an acrylate compound represented by the following formula (I):

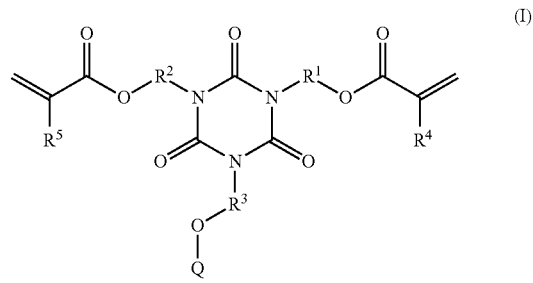

wherein in the formula (I), $R^1$, $R^2$ and $R^3$ each independently represent an alkylene group having from 1 to 6 carbon atoms; $R^4$ and $R^5$ each independently represent a hydrogen atom or a methyl group; and Q represents a hydrogen atom or a (meth)acryloyl group, provided that the component (a-3) contains at least one kind of the compound, wherein Q represents a hydrogen atom.

(3) The coating composition according to the item (1) or (2), wherein the coating composition contains a polyfunctional acrylate compound having 3 or more acrylate groups in one molecule and having a hydroxyl group as the component (a-1).

(4) The coating composition according to any one of the items (1) to (3), wherein the following condition (2-1) is satisfied:

the condition (2-1): in the total of Y and Z, Z is from 0 to 90% by mass.

(5) The coating composition according to any one of the items (1) to (4), wherein (B) the metal oxide is silicon oxide.

(6) An optical member containing a hard coat film that is formed with the coating composition according to any one of the items (1) to (5).

(7) The optical member according to the item (6), wherein the optical member further contains an antireflection film composed of an inorganic material on the hard coat film.

Advantageous Effects of Invention

The coating composition of the present invention can form an acrylic hard coat film that is excellent in adhesion to an antireflection film while having high scratch resistance.

DESCRIPTION OF EMBODIMENTS (A) Acrylate Component (A) the acrylate component contains the following components (a-1), (a-2) and (a-3):

(a-1): a polyfunctional acrylate compound having 3 or more acrylate groups in one molecule;

(a-2): a dendritic aliphatic compound having an acrylate group at an end thereof; and (a-3): an acrylate compound having 1 or 2 acrylate groups in one molecule; or a mixture of an acrylate compound having 1 or 2 acrylate groups in one molecule and an acrylate compound other than the components (a-1) and (a-2).

(a-1) Polyfunctional Acrylate Compound Having 3 or More Acrylate Groups in One Molecule In the present invention, the polyfunctional acrylate compound having 3 or more acrylate groups in one molecule (which may be hereinafter abbreviated as a polyfunctional acrylate compound) is used as the acrylate component from the standpoint of the adhesion and the scratch resistance of the hard coat film.

The component (a-1) is preferably a polyfunctional acrylate compound that contains no aromatic ring, and more preferably an acyclic polyfunctional acrylate compound that contains no aromatic ring, from the standpoint that the weather resistance of the hard coat film can be enhanced. The polyfunctional acrylate compound is not a dendritic aliphatic compound, and the component (a-1) does not include the component (a-2) described later.

Examples of the component (a-1) include a polyfunctional (meth)acrylate, such as pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, dipentaerythritol ethoxytetra(meth)acrylate, trimethylolpropane tri(meth)acrylate, trimethylolpropane ethoxytri(meth) acrylate, dimethylolpropane tri(meth)acrylate, ditrimethylolpropane tetra(meth)acrylate and glycerin propoxytri(meth)acrylate. Examples thereof also include an alkyl-modified (meth)acrylate, an ethylene oxide-modified (meth)acrylate and a propylene oxide-modified (meth)acrylate of the aforementioned compounds.

Among these, pentaerythritol tri(meth)acrylate, pentaerythritol tetra(meth)acrylate, dipentaerythritol hexa(meth)acrylate and trimethylolpropane tri(meth)acrylate are preferred, and pentaerythritol tri(meth)acrylate and pentaerythritol tetra(meth)acrylate are more preferred, from the standpoint of the adhesion and the scratch resistance.

The polyfunctional acrylate compound as the component (a-1) may be used solely or as a combination of two or more kinds thereof.

The coating composition preferably contains as the component (a-1) a polyfunctional acrylate compound having 3 or more acrylate groups in one molecule and having a hydroxyl group from the standpoint of the transparency and the flexibility of the hard coat film.

The content ratio of the polyfunctional acrylate compound having a hydroxyl group is preferably from 30 to 80% by mol, and more preferably from 50 to 75% by mol, in the component (a-1). When the content ratio is 30% by mol or more, no fog is caused in the hard coat film to provide good transparency, and when the content ratio is 80% by mol or less, a film having a high crosslinking density with high hardness can be formed.

As the component (a-1), the polyfunctional acrylate compound having 3 or more acrylate groups in one molecule and having a hydroxyl group may be used solely, or the compound and a polyfunctional acrylate compound having 3 or more acrylate groups in one molecule and having no hydroxyl group may be used in combination.

In the present invention, a mixture of the polyfunctional acrylate compound having a hydroxyl group and a polyfunctional acrylate compound having no hydroxyl group that is obtained by replacing the hydroxyl group of the polyfunctional acrylate compound having a hydroxyl group by an acrylate group can be preferably used as the component (a-1). The mixture is available, for example, as a commercial product of a mixture of pentaerythritol triacrylate and pentaerythritol tetraacrylate, and examples of the commercial product include M-306, a trade name, produced by Toagosei Co., Ltd.

The molecular weight of the component (a-1) is preferably from 200 to 1,500, more preferably from 250 to 1,000, and further preferably from 250 to 500. The viscosity of the component (a-1) is preferably approximately from 300 to 800 mPa·s, and more preferably from 350 to 700 mPa·s, at 25° C.

(a-2) Dendritic Aliphatic Compound Having Acrylate Group at End Thereof

In the present invention, the dendritic aliphatic compound having an acrylate group at an end thereof is used as the component (a-2) from the standpoint of the adhesion and the scratch resistance of the hard coat film. The dendritic aliphatic compound can proceed the curing reaction within a short period of time, thereby forming a hard coat film having high hardness without influence of oxygen inhibition on ultraviolet ray curing, and can suppress curing shrinkage to enhance the adhesion. Furthermore, since the component (a-2) contains no aromatic ring, yellowing on irradiation of an ultraviolet ray is prevented, and a hard coat film being excellent in transparency and weather resistance can be provided.

The dendritic aliphatic compound having an acrylate group at an end thereof as the component (a-2) is an aliphatic compound that contains no aromatic ring and is branched in a dendritic form, and many acrylate groups can be bonded to molecular ends due to the dendritic form, thereby showing high reactivity.

The component (a-2) is not particularly limited as far as it is a dendritic aliphatic compound having an acrylate group at an end thereof, and may be used solely or as a combination of two or more kinds thereof. In the dendritic aliphatic compound, a dendrimer and a hyper branched polymer are preferred. A dendrimer is a polymer that is branched with high regularity, and the hyper branched polymer is a polymer that is branched with low regularity, both of which have low viscosity and are excellent in solvent solubility as compared to a linear polymer.

Examples of the commercially available dendrimer capable of being used as the component (a-2) include Viscoat #1000 and Viscoat #1020, trade names, produced by Osaka Organic Chemical Industry, Ltd. Viscoat #1000 and Viscoat #1020 contain as a major component a multiple branched (dendrimer type) polyester acrylate having an acrylate group at an end thereof. Viscoat #1000 has a molecular weight of approximately from 1,000 to 2,000, and Viscoat #1020 has a molecular weight of approximately from 1,000 to 3,000.

Examples of the commercially available hyper branched polymer capable of being used as the component (a-2) include STAR-501 (SIRIUS-501 and SUBARU-501), trade names, produced by Osaka Organic Chemical Industry, Ltd. STAR-501 contains as a major component a multiple branched polyacrylate with dipentaerythritol as a core (dipentaerythritol hexaacrylate (DPHA) connected type) having an acrylate group at an end thereof. STAR-501 has a molecular weight of approximately from 16,000 to 24,000.

(a-3) Acrylate Compound Having 1 or 2 Acrylate Groups in One Molecule, or Mixture of Acrylate Compound Having 1 or 2 Acrylate Groups in One Molecule and Acrylate Compound Other Than Components (a-1) and (a-2)

The coating composition of the present invention contains as the component (a-3) an acrylate compound having 1 or 2 acrylate groups in one molecule (which may be hereinafter abbreviated as a monofunctional or bifunctional acrylate compound), or a mixture of an acrylate compound having 1 or 2 acrylate groups in one molecule and an acrylate compound other than the components (a-1) and (a-2) (which may be hereinafter abbreviated as a mixture), from the standpoint of imparting flexibility to the hard coat film.

By imparting flexibility to the hard coat film with the component (a-3) added, the formation of an antireflection film on the hard coat film can be facilitated, and the adhesion between the hard coat film and the antireflection film can be enhanced.

As the component (a-3), the monofunctional or bifunctional acrylate compound may be used solely, but the mixture is preferably used from the standpoint of the balance between the flexibility and the adhesion of the hard coat film.

The content of the monofunctional or bifunctional acrylate compound in the mixture is preferably 10% by mass or more from the standpoint of the flexibility of the hard coat film, and is more preferably from 20 to 60% by mass, and further preferably from 25 to 45% by mass, from the standpoint of the balance between the flexibility and the adhesion of the hard coat film.

The acrylate compound having 1 or 2 acrylate groups in one molecule is preferably an acrylate compound having 2 acrylate groups from the standpoint of the flexibility of the hard coat film.

The component (a-3) preferably contains an acrylate compound having an isocyanuric ring structure from the standpoint of the adhesion to the antireflection film for providing an excellent hard coat film, and more preferably contains one kind or two or more kinds selected from an acrylate compound represented by the following formula (I):

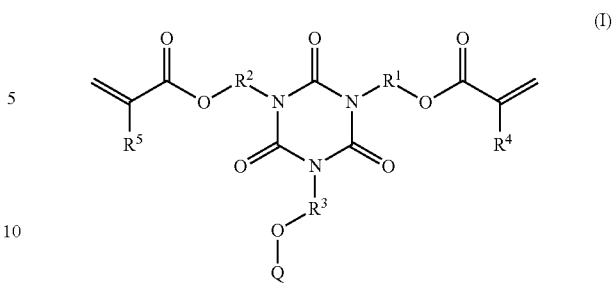

In the formula (I), $R^1$, $R^2$ and $R^3$ each independently represent an alkylene group having from 1 to 6 carbon atoms, and preferably an alkylene group having from 1 to 3 carbon atoms. $R^4$ and $R^5$ each independently represent a hydrogen atom or a methyl group, and Q represents a hydrogen atom or a (meth)acryloyl group, provided that in the case where the component (a-3) is the acrylate compound represented by the formula (I), at least one kind of the compound, wherein Q represents a hydrogen atom is contained.

For example, in the case where Q represents a hydrogen atom, an acrylate compound having 2 acrylate groups in one molecule is represented, and in the case where Q represents a (meth)acryloyl group, an acrylate compound having 3 acrylate groups in one molecule is represented.

The acrylate compound represented by the formula (I) is obtained by modifying isocyanuric acid with an alkylene oxide, and therein an ethylene oxide-modified (meth)acrylate compound, wherein $R^1$, $R^2$ and $R^3$ each represent an ethylene group, is preferred.

As the component (a-3), a mixture of: an acrylate compound having an isocyanuric ring structure and having 2 acrylate groups; and an acrylate compound having an isocyanuric ring structure and having 3 acrylate groups, is preferably used. Examples of the mixture include a product commercially available as a mixture of isocyanuric acid ethylene oxide-modified diacrylate and isocyanuric acid ethylene oxide-modified triacrylate, and examples of the commercially available product include M-313, a trade name, produced by Toagosei Co., Ltd.

The molecular weight of the component (a-3) is preferably from 200 to 1,500, more preferably from 250 to 1,000, and further preferably from 300 to 500. The viscosity of the component (a-31) is preferably approximately from 5,000 to 50,000 mPa·s, and more preferably from 10,000 to 40,000 mPa·s, at 25° C.

(B) Metal Oxide

The coating composition of the present invention contains (B) a metal oxide from the standpoint of the enhancement of the scratch resistance.

The component (B) is not particularly limited, and examples thereof include fine particles of aluminum oxide, titanium oxide, antimony oxide, silicon oxide, cerium oxide, iron oxide, zinc oxide and tin oxide. The metal oxide may be used solely or as a combination of two or more kinds thereof. Silicon oxide is preferred among the metal oxides from the standpoint of the further enhancement of the scratch resistance.

The metal oxide is preferably in the form of sol in order to suppress segregation thereof in the hard coat film, and silica sol is preferably used.

(B) the metal oxide having been coated with a silane coupling agent may be contained. The use of the metal oxide coated with a silane coupling agent can enhance the transparency and the adhesion of the hard coat film.

The silane coupling agent is preferably a silane coupling agent having a functional group, such as a (meth)acryloxy group. Specific examples of the silane coupling agent include methoxysilane, γ-methacryloxypropylmethyldiethoxysilane, γ-methacryloxypropyltriethoxysilane and γ-acryloxypropyltrimethoxysilane.

The amount of the silane coupling agent used is preferably from 1.5 to 10% by mass, and more preferably from 3 to 8% by mass, based on (B) the metal oxide. When the amount is 1.5% by mass or more, good compatibility of the component (A) is obtained, and when the amount is 10% by mass or less, the film hardness is not impaired.

Content Ratios

In the present invention, the mass ratio (B)/(A) of (B) the metal oxide to (A) the acrylate component is from 0.1 to 1.5, preferably from 0.3 to 1.0, and more preferably from 0.4 to 0.9. When the mass ratio is less than 0.1, the adhesion of the hard coat film cannot be obtained, and when the mass ratio exceeds 1.5, the flexibility of the hard coat film is not sufficient, and excellent adhesion cannot be obtained.

(A) The acrylate component contains the components (a-1), (a-2) and (a-3), and the content ratio X of the component (a-1), the content ratio Y of the component (a-2) and the content ratio Z of the component (a-3) satisfy the following conditions (1) and (2):

the condition (1): in (A) the acrylate component, X is from 40 to 60% by mass, and a total of Y and Z is from 60 to 40% by mass, and the condition (2): in the total of Y and Z, Z is 0% by mass or more and less than 100% by mass.

In the case where X and the total of Y and Z do not satisfy the condition (1), the balance between the flexibility and the adhesion of the hard coat film cannot be obtained, and the adhesion or the film hardness is impaired.

The condition is preferably the condition (1-1): X is 50% by mass, and the total of Y and Z is 50% by mass, i.e., the mass ratios of X and the total of Y and Z are equal to each other.

In the case where Z in the total of Y and Z does not satisfy the condition (2), the adhesion of the hard coat film is considerably deteriorated.

The condition is preferably the condition (2-1): in the total of Y and Z, Z is from 0 to 90% by mass.

The condition is more preferably the condition (2-1-2): in the total of Y and Z, Z is from 40 to 80% by mass.

In the coating composition of the present invention, one of preferred embodiments of the content ratios of (A) the acrylate component, the components (a-1), (a-2) and (a-3) constituting the same, and (B) the metal oxide is that:

the mass ratio (B)/(A) is from 0.4 to 0.7, the condition (1): in (A) the acrylate component, X is from 40 to 60% by mass, and a total of Y and Z is from 60 to 40% by mass, and the condition (2-1): in the total of Y and Z, Z is from 0 to 90% by mass.

One of more preferred embodiment thereof is that:

the mass ratio (B)/(A) is from 0.4 to 0.55, the condition (1-1): in (A) the acrylate component, X is 50% by mass, and the total of Y and Z is 50% by mass, and the condition (2-1-1): in the total of Y and Z, Z is from 0 to 80% by mass.

Another one of more preferred embodiment thereof is that:

the mass ratio (B)/(A) is from 0.6 to 0.7, the condition (1-1): in (A) the acrylate component, X is 50% by mass, and the total of Y and Z is 50% by mass, and the condition (2-1-2): in the total of Y and Z, Z is from 40 to 80% by mass.

In the case where the content ratios of (A) the acrylate component, the components (a-1), (a-2) and (a-3) constituting the same, and (B) the metal oxide satisfy the aforementioned conditions, excellent adhesion to an antireflection film can be obtained while having high scratch resistance, and furthermore the excellent adhesion to an antireflection film can be retained after a weathering test under severe conditions (QUV test).

One of other preferred embodiment thereof is that:

the mass ratio (B)/(A) is from 0.7 to 1.0, and the condition (1): in (A) the acrylate component, X is from 40 to 60% by mass, and a total of Y and Z is from 60 to 40% by mass.

One of other more preferred embodiment thereof is that:

the condition (2-2): in the total of Y and Z, Z is from 50 to 90% by mass, the mass ratio (B)/(A) is from 0.7 to 1.0, the condition (1): in (A) the acrylate component, X is from 40 to 60% by mass, and a total of Y and Z is from 60 to 40% by mass, and the condition (2-2): in the total of Y and Z, Z is from 50 to 90% by mass.

One of other preferred embodiment thereof is that:

the mass ratio (B)/(A) is from 0.7 to 0.9, the condition (1): in (A) the acrylate component, X is 50% by mass, and the total of Y and Z is 50% by mass, and the condition (2-2-1): in the total of Y and Z, Z is from 60 to 80% by mass.

In the case where the content ratios of (A) the acrylate component, the components (a-1), (a-2) and (a-3) constituting the same, and (B) the metal oxide satisfy the aforementioned conditions, excellent adhesion to an antireflection film can be obtained while having high scratch resistance, and furthermore the excellent adhesion to an antireflection film can be retained after a weathering test under severe conditions (QUV test).

Additive

The coating composition of the present invention may contain depending on demand a reaction initiator in order to cure the coating composition within a shorter period of time, and an organic solvent and a leveling agent in order to enhance the wettability on coating the coating composition and enhance the flatness of the cured film. Furthermore, an ultraviolet ray absorbent, an antioxidant, a light stabilizer and the like may also be added unless the properties of the cured film are influenced.

Method for Producing Coating Composition

The coating composition of the present invention can be produced by mixing and stirring the components (a-1), (a-2) and (a-3) constituting (A) the acrylate component, (B) the metal oxide, and depending on necessity the additive. The order of mixing the components is not particularly limited. An organic solvent may be used on mixing and stirring, and examples thereof used include, specifically, methyl ethyl ketone, 1-methoxy-2-propanol and propylene glycol monomethyl ether.

Optical Member

The coating composition of the present invention is excellent in adhesion to an antireflection film while having high scratch resistance, and therefore an optical member, such as a spectacle lens, having a hard coat film can be produced by using the coating composition of the present invention.

Specifically, the coating composition of the present invention can be coated on a substrate and cured to form a hard coat film, and an antireflection film composed of an inorganic material can be formed on the hard coat film, thereby producing an optical member having an acrylic hard coat film that is excellent in adhesion to the antireflection film while having high scratch resistance. The optical member can be produced by a known method.

The substrate used may be plastic substrates formed of various raw materials, for example, various substrates having a refractive index of approximately 1.50 to a high refractive index of 1.67 or more. The coating composition of the present invention can exhibit the advantageous effects of the present invention for the wide range of substrates.

The antireflection film can be formed by a vapor deposition method, such as a physical vapor deposition method, e.g., a vacuum vapor deposition method, a sputtering method and an ion plating method, and a chemical vapor deposition method, such as thermal CVD, plasma CVD and photo CVD, using an oxide of a metal, such as Si, Al, Sn, Nb, Sb, Ta, Ce, La, Fe, Zn, W, Zr, In and Ti. The advantageous effects of the present invention are not restricted by the number of layers of the antireflection film.

EXAMPLE

The present invention will be described in more detail with reference to examples, but the present invention is not limited to the examples.

In Examples and Comparative Examples, the following materials were used.
(A) Acrylate Component
(a-1) Polyfunctional Acrylate Compound Having 3 or More Acrylate Groups in One Molecule M-306 (a trade name, produced by Toagosei Co., Ltd., pentaerythritol acrylate (mixture of triacrylate and tetraacrylate with a content of triacrylate (one hydroxyl group per one molecule) of from 65 to 70%, viscosity at 25° C.: 400 to 600 mPa·s)
(a-2) Dendritic Aliphatic Compound Having Acrylate Group at End Thereof SIRIUS (SIRIUS-501, a trade name, produced by Osaka Organic Chemical Industry, Ltd.)
(a-3) Acrylate Compound Having 1 or 2 Acrylate Groups in One Molecule, or Mixture of Acrylate Compound Having 1 or 2 Acrylate Groups in One Molecule and Acrylate Compound Other Than Components (a-1) and (a-2)

M-313 (a trade name, produced by Toagosei Co., Ltd., isocyanuric acid ethylene oxide-modified acrylate (mixture of diacrylate and triacrylate with a content of diacrylate of from 30 to 40%, viscosity at 25° C.: 20,000 to 36,000 mPa·s)
(B) Metal Oxide Silica sol (PGM-ST, a trade name, $SiO_2$: 30% by mass, produced by Nissan Chemical Industries, Ltd.)

Examples 1 to 19 and Comparative Examples 1 to 4

Coating composition solutions were produced by using the aforementioned materials with the mixing ratios shown in Table 1. The coating composition solutions were produced in the following manner.

1-Methoxy-2-propanol as a solvent, (B) the metal oxide (100 parts by mass based on the total amount), and 5 parts by mass of a silane coupling agent (KBM-503, a trade name, γ-methacryloxypropylmethyldiethoxysilane, produced by Shin-Etsu Chemical Co., Ltd.) were added in a glass vessel, and stirred at 55° C. and 450 rpm to coat the silane coupling agent on (B) the metal oxide.

The solution containing the coated metal oxide was filtered through a filter having a filtering diameter of 5 μm, with which the components (a-1), (a-2) and (a-3) were then mixed and stirred. Thereafter, a leveling agent (Y-7006, a trade name, polyoxyalkylene-dimethylpolysiloxane copolymer, produced by Dow Corning Toray Co., Ltd.) and a reaction initiator (Irgacure 184, a trade name, produced by Ciba Specialty Chemicals Co., Ltd.) were added thereto, followed by stirring, thereby producing a solution of a coating composition.
Evaluation Method A hard coat film and an antireflection film were formed on a plastic lens substrate by using the coating composition solutions obtained in Examples and Comparative Examples in the following manner, and the adhesion and the scratch resistance were evaluated. The evaluation results are shown in Table 1.
Formation of Hard Coat Film On a lens substrate having a refractive index of 1.67 (material: thermosetting polythiourethane resin, produced by HOYA Corporation, trade name: EYNOA), the resulting coating composition solution was coated with a spin coater (produced by Mikasa Co., Ltd.).

The substrate having the coating solution coated thereon was irradiated with an ultraviolet ray by using F300S (model name, produced by Fusion UV Systems, Inc.) to cure the coating liquid, thereby forming a hard coat film having a thickness of 3 μm.
Formation of Antireflection Film Subsequently, on the hard coat film, an antireflection film having 7 layers formed of $SiO_2$ and $ZrO_2$ was formed by a vacuum vapor deposition method.
Evaluation of Adhesion, Adhesion Between Hard Coat Film and Antireflection Film
Initial Adhesion At three positions, both end portions and a center portion on the antireflection film, of the plastic lens thus obtained, the lens was cross-cut with a distance of 1.5 mm to form 100 cells. An adhesive tape (Cellotape, a registered trade name, produced by Nichiban Co., Ltd.) was firmly adhered to the cross-cut portion, and after quickly peeling the adhesive tape therefrom, the presence of delamination of the antireflection film was observed.

A case where no delamination occurred was evaluated as 100/100/100, and a case where all cells were delaminated was evaluated as 0/0/0. A case where the number of cells of the antireflection film delaminated was 50 or more in any one of the both end portions and the center portion was determined as deteriorated adhesion.
QUV Adhesion The plastic lens thus obtained was subjected to ultraviolet ray irradiation and dew condensation repeatedly by using an ultraviolet ray fluorescent lamp accelerated weathering tester (QUV Weathering Tester (produced by Q-Lab Corporation) equipped with UVA-340 Lamp (295 to 365 nm) under the following conditions, so as to perform the durability test in one week in total (168 hours, 21 cycles).

Ultraviolet ray irradiation condition: 0.2 $W/m^2$, temperature: 45° C., incident angle: 0 to 70°, 4 hours Dew condensation condition: temperature: 45° C., humidity: 90% RH The plastic lens after subjecting to the ultraviolet ray irradiation was evaluated for the adhesion after the QUV test in the same manner as in the evaluation of the initial adhesion.
Evaluation of Scratch Resistance The surface of the antireflection film was scratched with steel wool #0000 by 20 reciprocations under a load of 1 kg, and the difficulty in scratching was visually evaluated.

As a result, in all Examples and Comparative Examples, such an evaluation was obtained that substantially no scratch was formed.

TABLE 1

| | (A) Acrylate component | | | | | | Evaluation | |
|---|---|---|---|---|---|---|---|---|
| | X | Y | Z | X:Y + Z | Z in Y + Z | (B)/(A) | Adhesion to antireflection film | |
| | (% by mass) | (% by mass) | (% by mass) | (% by mass) | (% by mass) | mass ratio | Initial adhesion | QUV adhesion |
| Comparative Example 1 | 50 | 10 | 40 | 50:50 | 80 | 0 | 0/30/0 | — |
| Comparative Example 2 | 50 | 10 | 40 | 50:50 | 80 | 0.05 | 30/45/50 | — |
| Example 1 | 50 | 50 | 0 | 50:50 | 0 | 0.3 | 100/100/100 | 0/0/0 |
| Example 2 | 50 | 40 | 10 | 50:50 | 20 | 0.3 | 80/80/80 | 0/0/0 |
| Example 3 | 50 | 30 | 20 | 50:50 | 40 | 0.3 | 100/100/100 | 0/0/0 |
| Example 4 | 50 | 20 | 30 | 50:50 | 60 | 0.3 | 100/100/100 | 0/0/0 |
| Example 5 | 50 | 10 | 40 | 50:50 | 80 | 0.3 | 100/100/100 | 0/0/0 |
| Comparative Example 3 | 50 | 0 | 50 | 50:50 | 100 | 0.3 | 50/30/99 | 50/20/99 |
| Example 6 | 50 | 50 | 0 | 50:50 | 0 | 0.5 | 100/100/100 | 100/100/100 |
| Example 7 | 50 | 40 | 10 | 50:50 | 20 | 0.5 | 80/90/95 | 85/85/85 |
| Example 8 | 50 | 30 | 20 | 50:50 | 40 | 0.5 | 100/100/100 | 97/97/97 |
| Example 9 | 50 | 20 | 30 | 50:50 | 60 | 0.5 | 100/100/100 | 97/97/97 |
| Example 10 | 50 | 10 | 40 | 50:50 | 80 | 0.5 | 100/100/100 | 100/100/100 |
| Comparative Example 4 | 50 | 0 | 50 | 50:50 | 100 | 0.5 | 50/98/99 | 30/98/90 |
| Example 11 | 50 | 50 | 0 | 50:50 | 0 | 0.67 | 80/80/80 | 20/20/20 |
| Example 12 | 50 | 30 | 20 | 50:50 | 40 | 0.67 | 100/100/100 | 93/93/93/ |
| Example 13 | 50 | 20 | 30 | 50:50 | 60 | 0.67 | 97/99/99 | 70/70/70 |
| Example 14 | 50 | 10 | 40 | 50:50 | 80 | 0.67 | 100/100/100 | 99/99/99 |
| Example 15 | 50 | 30 | 20 | 50:50 | 40 | 0.8 | 60/60/60 | — |
| Example 16 | 50 | 20 | 30 | 50:50 | 60 | 0.8 | 100/100/100 | 100/100/100 |
| Example 17 | 50 | 10 | 40 | 50:50 | 80 | 0.8 | 100/100/100 | 100/100/100 |
| Example 18 | 50 | 20 | 30 | 50:50 | 60 | 1.0 | 90/90/90 | — |
| Example 19 | 50 | 10 | 40 | 50:50 | 80 | 1.0 | 98/98/98 | — |

X: content ratio of (a-1),
Y: content ratio of (a-2),
Z: content ratio of (a-3)

INDUSTRIAL APPLICABILITY

The coating composition of the present invention is excellent in adhesion to an antireflection film while having high scratch resistance, and thus is particularly favorably used as a coating composition for forming a hard coat film of a spectacle lens.

The invention claimed is:

1. A spectacle lens comprising a hard coat film that is formed with a coating composition comprising (A) an acrylate component and (B) a metal oxide, wherein
   a mass ratio (B)/(A) of (B) the metal oxide to (A) the acrylate component is from 0.1 to 1.5, (A) the acrylate component comprises the following components (a-1), (a-2) and (a-3):
   (a-1): a polyfunctional acrylate compound having 3 or more acrylate groups in one molecule;
   (a-2): a dendritic aliphatic compound having an acrylate group at an end thereof; and
   (a-3): at least one acrylate compound represent by the following formula (I):

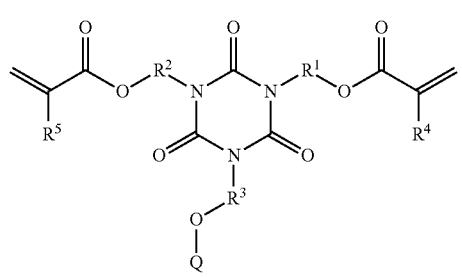

(I)

where
   $R^1$, $R^2$ and $R^3$ each independently represent an alkylene group having from 1 to 6 carbon atoms,
   $R^4$ and $R^5$ each independently represent a hydrogen atom or a methyl group, and
   Q represents a hydrogen atom or a (meth)acryloyl group, provided that the component (a-3) contains at least one kind of the compound, wherein Q represents a hydrogen atom;

X represents a content ratio of the component (a-1), Y represents a content ratio of the component (a-2), and Z represents a content ratio of the component (a-3);

the content of X is from 40 to 60% by mass, and the total content of Y and Z is from 60 to 40% by mass, based on 100% by mass of (A); and the content of Z is 20 to 90% by mass, based on the total content of Y and Z.

2. The spectacle lens according to claim 1, wherein the coating composition contains a polyfunctional acrylate compound having 3 or more acrylate groups in one molecule and having a hydroxyl group as the component (a-1).

3. The spectacle lens according to claim 1, wherein the content of Z is 50 to 90% by mass, based on the total content of Y and Z.

4. The spectacle lens according to claim 1, wherein (B) the metal oxide is silicon oxide.

5. The spectacle lens according to claim 1, wherein the spectacle lens further comprises an antireflection film composed of an inorganic material that is adhered to the hard coat film.

* * * * *